US012595013B2

(12) United States Patent
Esposito

(10) Patent No.: US 12,595,013 B2
(45) Date of Patent: Apr. 7, 2026

(54) ENCLOSED MOBILITY SCOOTER

(71) Applicant: Charles Esposito, Hasbrouck Heights, NJ (US)

(72) Inventor: Charles Esposito, Hasbrouck Heights, NJ (US)

( * ) Notice: Subject to any disclaimer, the term of this patent is extended or adjusted under 35 U.S.C. 154(b) by 382 days.

(21) Appl. No.: 18/364,559

(22) Filed: Aug. 3, 2023

(65) Prior Publication Data

US 2025/0042493 A1     Feb. 6, 2025

(51) Int. Cl.
| | |
|---|---|
| *B62J 17/08* | (2020.01) |
| *B62J 17/086* | (2020.01) |
| *B62K 5/007* | (2013.01) |
| *B62K 19/46* | (2006.01) |
| *B62K 21/22* | (2006.01) |

(52) U.S. Cl.
CPC ............. *B62J 17/086* (2020.02); *B62K 5/007* (2013.01); *B62K 19/46* (2013.01); *B62K 21/22* (2013.01); *B62K 2202/00* (2013.01)

(58) Field of Classification Search
CPC ......... B62J 17/086; B62J 17/08; B62K 5/007; B62K 5/003; B62K 19/46; B62K 21/22; B62K 21/18; B62K 2202/00
See application file for complete search history.

(56) References Cited

U.S. PATENT DOCUMENTS

| | | | | | |
|---|---|---|---|---|---|
| 4,802,542 A | * | 2/1989 | Houston | .............. | A61G 5/1051 |
| | | | | | 297/DIG. 10 |
| 5,203,601 A | * | 4/1993 | Guillot | .................... | B62K 5/01 |
| | | | | | 296/102 |
| 5,265,689 A | * | 11/1993 | Kauffmann | .......... | A61G 5/1051 |
| | | | | | 297/DIG. 10 |
| 5,701,968 A | * | 12/1997 | Wright-Ott | ............ | A61G 5/128 |
| | | | | | 180/907 |
| 5,890,507 A | * | 4/1999 | Hinsperger | ............ | A45B 11/00 |
| | | | | | 135/900 |
| 6,659,211 B2 | * | 12/2003 | Esposito | .............. | A61G 5/1051 |
| | | | | | 180/907 |
| 8,567,804 B1 | * | 10/2013 | Hoenhause | ............ | A61G 5/122 |
| | | | | | 280/220 |
| 8,740,240 B1 | * | 6/2014 | Merel | .................... | A61G 5/046 |
| | | | | | 482/69 |
| 9,359,041 B1 | * | 6/2016 | Lim | ......................... | B62M 1/26 |
| 10,040,501 B2 | * | 8/2018 | Haines | ..................... | B62J 17/08 |

(Continued)

*Primary Examiner* — John D Walters

(74) *Attorney, Agent, or Firm* — Daniel M. Cohn; Howard M. Cohn

(57)     ABSTRACT

An enclosed mobility scooter has a block-shaped base which serves as a chassis and a vehicle platform. The block shaped base extends in the longitudinal direction of the vehicle and has two longitudinal sides and a front end and a rear end. The base is constructed with two front wheels and two rear wheels attached to the two longitudinal sides. The enclosed mobility scooter can be controlled by a person standing on the base. The person is supported by a back support which is mounted to a first column secured at a lower end to the base. A head support mounted to an upper end of a second column. A clear enclosure mounted to the base has front and rear sides which extend from the base to the top of the enclosure. The clear enclosure has two side openings through which the person can enter or exit the mobility scooter.

17 Claims, 4 Drawing Sheets

(56) References Cited

U.S. PATENT DOCUMENTS

| | | | |
|---|---|---|---|
| 11,744,765 B2 * | 9/2023 | Liu | A63B 21/00 128/845 |
| 2006/0266566 A1 * | 11/2006 | Steadman | B62J 1/28 180/65.1 |
| 2024/0092448 A1 * | 3/2024 | Maor | B62J 43/10 |

* cited by examiner

ENCLOSED MOBILITY SCOOTER

TECHNICAL FIELD OF THE INVENTION

The present invention relates to an enclosed mobility scooter for transporting persons, having an electric drive.

BACKGROUND OF THE INVENTION

Various types of small vehicles which are intended to simplify the mobility of elderly and disabled persons are known from the prior art. These mobility scooters or electric scooters are embodied as electrically driven small vehicles with a steering handlebar and a seat which is arranged centrally above the longitudinal axis of the vehicle.

Furthermore, small electric vehicles for specific purposes of use are known. These include, for example, electric golf buggies, which are in some cases also referred to as electric golf caddies. For leisure time activities, two-wheeled, self-balancing electric vehicles are also provided. All these small vehicles have in common the fact that they are tailored to a specific field of application. A small vehicle which can be used for a multiplicity of purposes of use and which can be used in a versatile way in everyday life.

A small vehicle for transporting persons, having an electric drive which comprises at least one electric motor, having a battery, having a base body which extends longitudinally from a front and to a rear end, wherein one or two front wheels and at least two rear wheels are fastened to the base body, and having a steering device for steering one or more of the wheels. At least the rear half of the base body is bounded in the upward direction by an essentially level loading surface, and wherein the electric motor and the battery are arranged underneath the loading surface or in one or more of the wheels, and, as a result, which is characterized in that a seating device is provided which comprises a seating surface which is mounted by supports, wherein the supports are mounted at the outer lateral ends of the base body or of the loading surface.

SUMMARY OF THE PRESENT INVENTION

According to the present invention, an enclosed mobility scooter has a block-shaped base which serves as a chassis and a vehicle platform. The block shaped base extends in the longitudinal direction of the vehicle and has two longitudinal sides and a front end and a rear end. The base is constructed with two front wheels and two rear wheels attached to the two longitudinal sides. The enclosed mobility scooter can be controlled by a person standing on the base. The person can be supported by a back support which is mounted to a first column secured at a lower end to the base. A head support is mounted to an upper end of a second column. A clear enclosure mounted to the base has front and rear sides which extend from the base to the top of the enclosure. The clear enclosure has two side openings through which the person can enter or exit the enclosed mobility scooter.

BRIEF DESCRIPTION OF THE DRAWINGS

The structure, operation, and advantages of the present invention will become further apparent upon consideration of the following description taken in conjunction with the accompanying figures (Figs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

Figure 1:
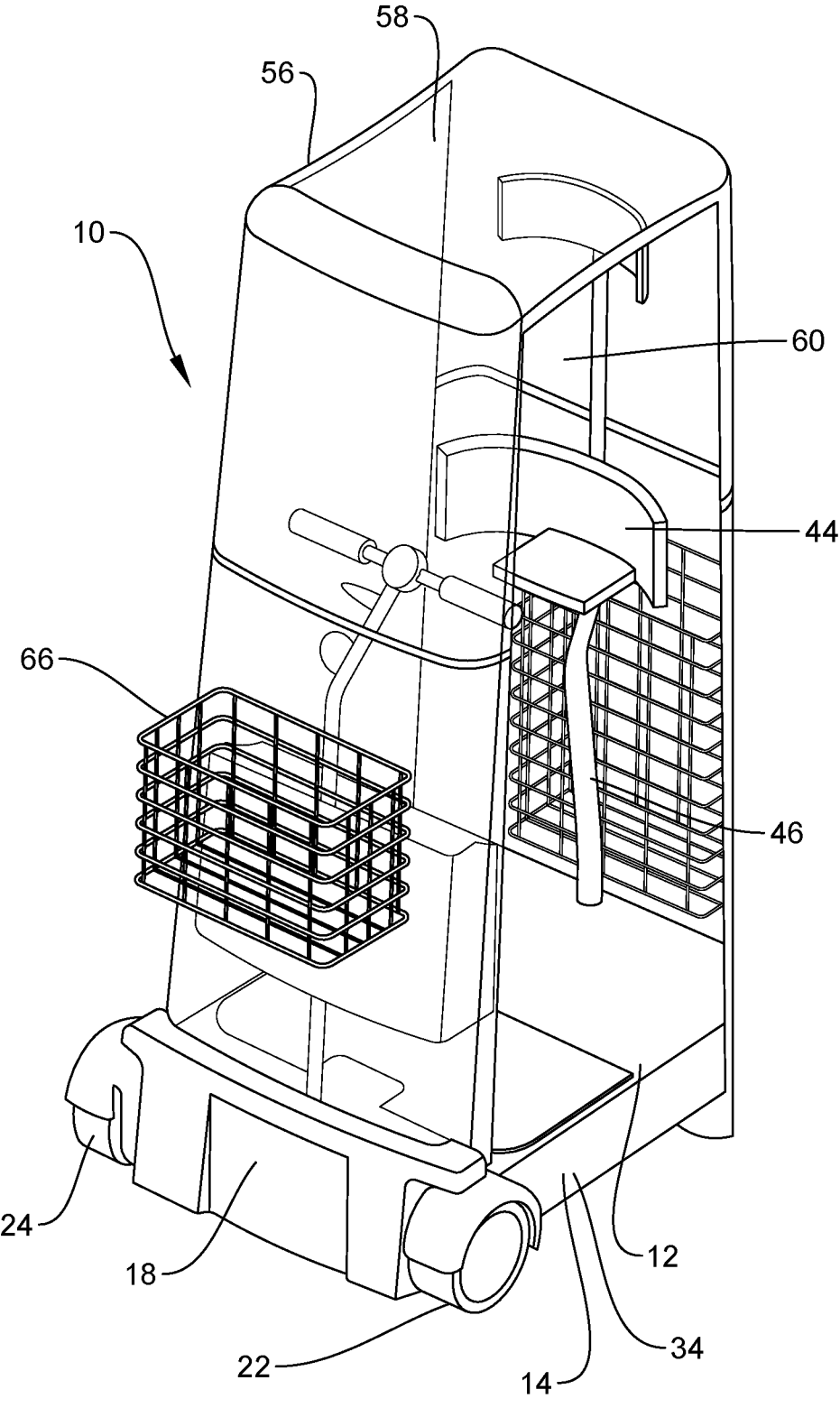
FIG. 1 shows a three-dimensional view of an enclosed mobility scooter, according to the invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

Figure 2:
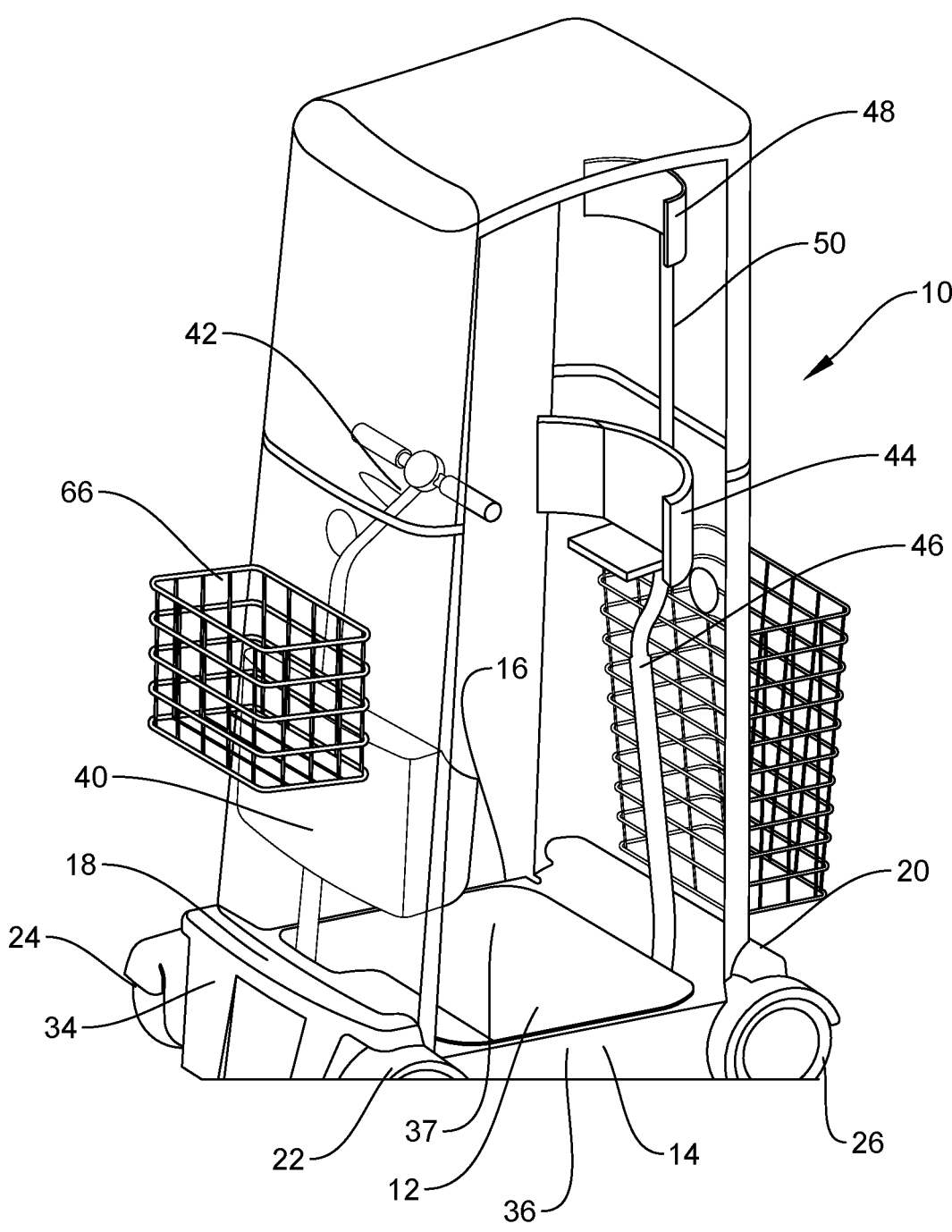
FIG. 2 shows a three-dimensional front side view of the enclosed mobility scooter with the enclosure, according to the invention.
Figure 3:
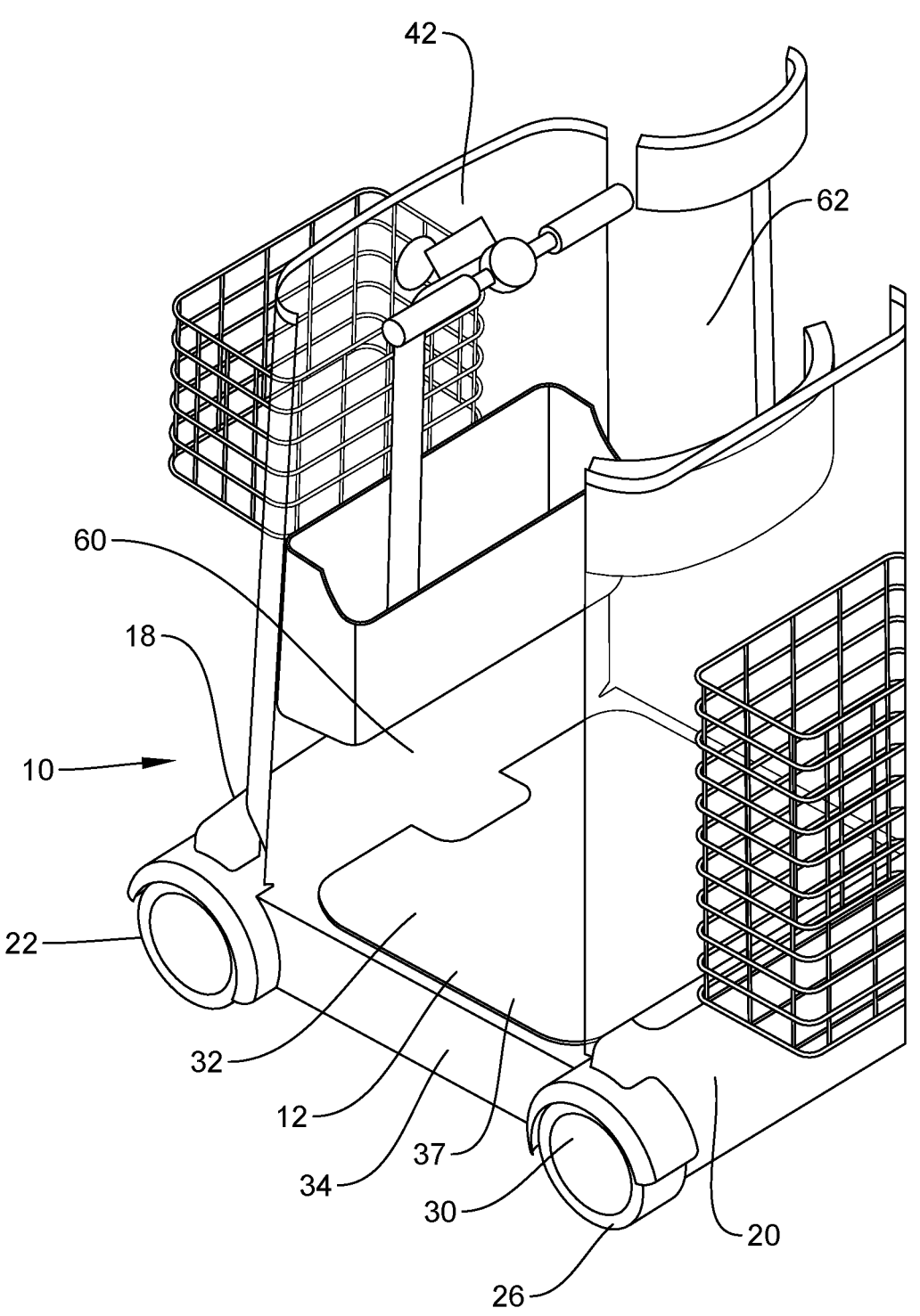
FIG. 3 shows a three-dimensional rear side view of the enclosed mobility scooter without the enclosure, according to the invention.

The enclosed mobility scooter 10 which is shown in FIGS. 1, 2 and 3 has a block-shaped base 12 which can be manufactured, for example, by injection molding and serves as a chassis and a vehicle platform. The block-shaped base 12 is composed mainly of two injection-molded parts which are connected to one another and form the block-shaped base 12. The base 12 is formed in plan view as a rectangular shaped body. The base 12 extends in the longitudinal direction of the vehicle and has two longitudinal sides 14 and 16 and a front end 18 and a rear end 20.

The base 12 or parts of the base 12 can also be fabricated by deep-drawing or tensile compressive shaping of one or more metal blanks or in some other way, for example by means of an injection pressing method or extrusion. The base 12 can also be fabricated from plastic, from metal and plastic, from composite materials, fiber composites, or other materials.

Irrespective of the manner in which the base 12 is constructed, two front wheels 22 and 24 and two rear wheels 26 and 28 are attached to the two longitudinal sides 14 and 16 of the base 12. The base 12 has suitable fastening points.

In addition, the wheels 22, 24, 26 and 28 are spring-mounted with respect to the base body 12 using spring means and damping means 30.

The rear wheels 26 and 28 are driven by means of an electric motor (not shown). The electric motor is connected to two accumulators (not shown) to store electrical energy which serves as a power supply. The accumulators supply power to the electric motors and the drive train (not shown) through cables disposed in the interior of the base 12. In order to charge the accumulators, appropriate connections are provided on an outer side of the base 12.

The upper side of the base 12 is formed by a substantially level loading 0surface 32. Longitudinal fenders 34 and 36 are attached to the longitudinal sides of the base 12 by means of the wheels 22, 24, 26, and 28. The front fender 18 and the rear fender 20 each adjoin the lateral running boards 34 and 36, with the result that the base 12, the front and rear fenders 18 and 20 and the longitudinal running boards 34 and 36 to form a substantially rectangular surface 37 in plan view.

In the front region of the vehicle between the front wheels 22 and 24, a steering column 40, whose inclination is adjustable, is fastened to the base 12. The steering column 40 can be moved to a substantially upright position (as illustrated in FIG. 1) or else moved into an oblique position in the rearward or forward directions by tilting, and can therefore be adapted to different sizes of driver. The steering column 40 can also be folded into a virtually horizontal position, for example after the vehicle has been parked.

At the upper end of the steering column 40, an operator control unit 42 is provided which can be used to steer the front wheels 22 and 24, actuate the electric motor and therefore drive the enclosed mobility scooter 10. The operator control unit 42 comprises an on and off switch 44 for the electric motor, a speed regulator and, if appropriate, further switches and regulators in order, for example, to switch or regulate other electrical devices on the small vehicle, such as a lighting system.

The electric motor, the accumulators, all the elements for transmitting the force from the electric motor to the wheels 22 and 24 and at least partially the wheel suspension devices are arranged underneath the loading surface 37. In this way, a free loading surface 37 which is as large as possible is obtained.

The loading surface 37 of the base 12 is provided with longitudinal running boards 34 and 36 which extend in the longitudinal direction of the loading surface 37 and to which goods which are to be transported can be secured. Instead of the longitudinal running boards 34 and 36, or in addition thereto, eyelets or hooks can also be provided for fastening transportation goods. It is also possible to attach a solar module, which also serves as a loading surface 37, to the base 12. The solar module is of weather-resistant and crushproof design.

In the embodiment illustrated in FIG. 1, the vehicle can be controlled by a person standing on the base 12 of the vehicle 10. The person can be supported by a back support 44 which is mounted to a column 46 secured at a lower end to the base 12 by any desired means. The back support 44 can be secured to the column 46 so that it is adjustable and can move towards and away from the base 12 as required. The back support 44 can have a curved shape to support the sides of the person's back. A head support 48 can be mounted to the upper end of a column 50. The bottom end of the column 50 can be secured to the upper end of column 46. The head support 48 can have a curved shape to support the sides of the person's head.

As shown in FIG. 1, a clear, plastic enclosure 56 can be provided so that the person can stand in the enclosure and operate the vehicle 10. The enclosure 56 is mounted to the base 12 and has a front side 57 and a rear side 59 which extend from the base 12 to the top 58. The enclosure 56 can have two side openings 60 and 62 through which an operator can enter or exit the vehicle 10.

A basket 66 can be attached to the front part of the enclosure 56 of the vehicle 10. In addition, a basket 68 can be attached to the rear part of the enclosure of the vehicle 10.

Figure 4:
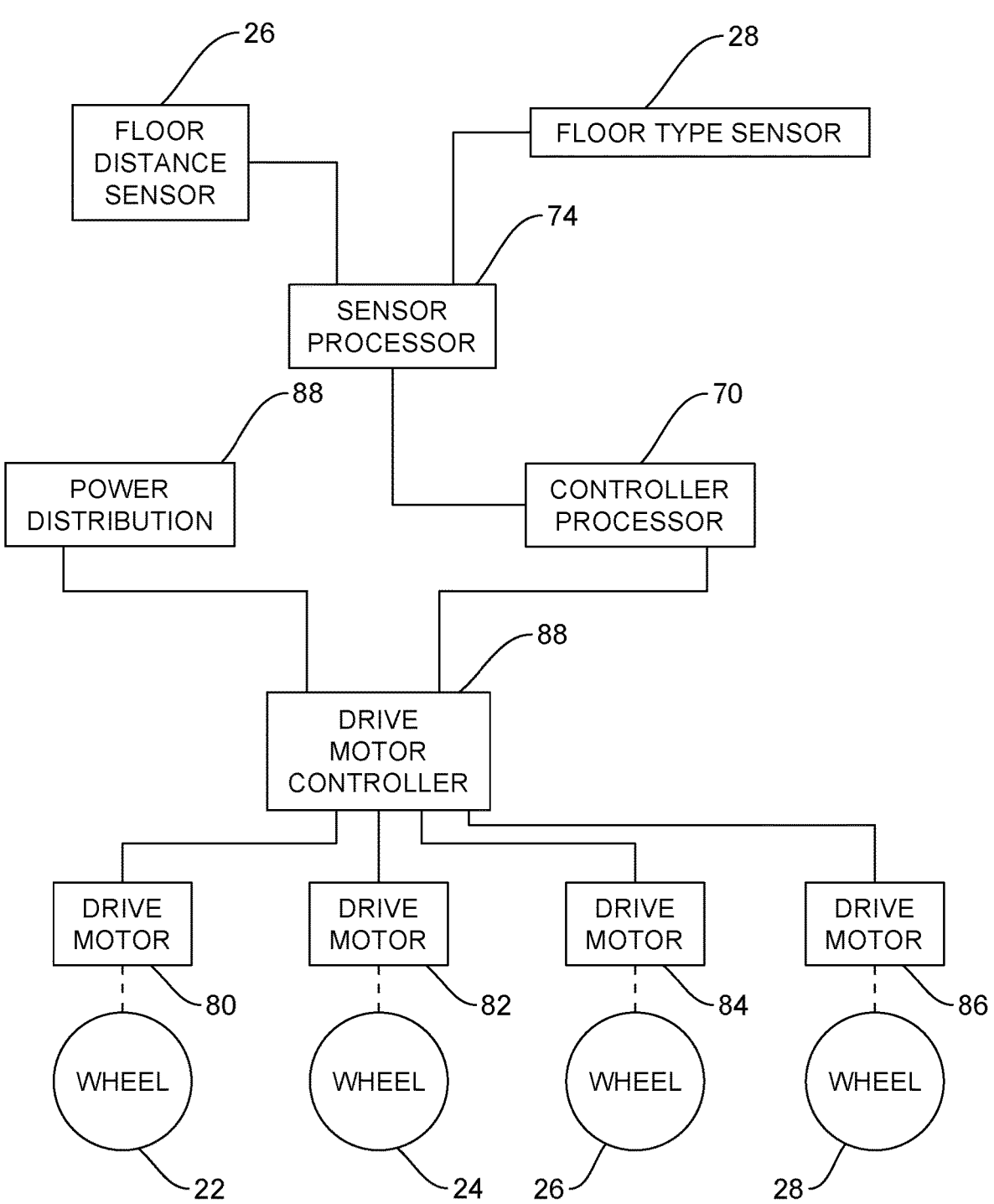
FIG. 4 is a functional block diagram showing an embodiment of the circuitry of the enclosed mobility scooter, according to the invention.

As shown in FIG. 4, the enclosed mobility scooter 10 incorporates a controller processor 70, a power distribution 72, a sensor processor 74, a floor distance sensor 76, a floor type sensor 78, four drive motors 80, 82, 84, 86 and a drive motor controller 88. The drive motors operate wheels 22, 24, 26 and 28 respectively.

Power distribution 72 receives power from a power source and distributes power to other components of the enclosed mobility scooter, including the controller processor 70, the sensor processor 74, and the drive motor controller 88. The power source, for example, may be located in the base 12. Power distribution 88 may be a terminal strip, discreet wiring, or any suitable combination of components that conduct electrical power to the proper components. For example, if any components within the enclosed mobility scooter 10 require voltage, frequency, or phase that is different than that provided by the power source, power distribution 88 may include power regulation, conditioning, and/or conversion circuitry suitable to provide the required voltage(s), frequencies, and/or phase(s).

The sensor processor 74 processes information detected by the floor distance sensor 76 and the floor type sensor 78. The sensor processor 74 detects if there is an obstruction in front of the wheels 22, 24, 26 or 28. If there is an obstruction, the sensor processor 74 issues a visual indication via LED and a control signal to the controller processor 70 to shut the drive motors off. The sensor processor 74 can distinguish a foreign object obstruction condition. If desired, the sensor processor 74 can communicate the detected conditions to the controller processor 70 and the controller processor can determine whether the drive motors 80, 82, 84 and/or 86 should be shut down or controlled differently and/or whether associated indicators should be illuminated and/or annunciators (i.e., alarms) should be sounded. Once the controller processor 70 determines a course of action, it communicates appropriate instructions to the appropriate motor controllers.

With the enclosed mobility scooter, catastrophic failure will occur if stairs or other potential height changes in floor surfaces are not detected. To this end, the floor distance sensor 76, in combination with the sensor processor 74, detects height changes in floor surfaces and issues a control signal to the controller processor 70 for a stop and reverse command so that the enclosed mobility scooter 10 does not tumble down the stairs.

The floor distance sensor 76, in combination with the sensor processor 74, detects a drop-off in the floor that would cause the enclosed mobility scooter to hang up or fall. For example, the floor distance sensor 76 detects when the base 12 is at the top of a staircase or when the base 12 approaches a hole or substantial dip in the surface area being traversed.

In one embodiment, the floor distance sensor 76 can include two infrared (IR) sensors mounted approximately 5 cm off the ground at about a 20° angle normal to vertical. The floor distance sensor 76 can communicate information to the sensor processor 74. In turn, the sensor processor 74 can communicate the detected conditions to the controller processor 70. The controller processor 70 controls the drive motors 80, 82, 84, and 86 of the wheels 22, 24, 26 and 28 to maneuver in order to avoid the surface area when a hazardous surface condition is detected.

the enclosed mobility scooter 10 can be fitted with a fan or air conditioning. In addition, head lights can be mounted to the front side of the plastic enclosure 56 and brake lights can be mounted to the rear side of the enclosure 56.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An enclosed mobility scooter, comprising:
a base, a controller processor, a power distribution, a sensor processor, a floor distance sensor, a floor type sensor, four drive motors, a drive motor controller, and a vehicle platform;
wherein the base is block-shaped and serves as a chassis, and the base extends in a longitudinal direction of the enclosed mobility scooter and has two longitudinal sides and a front end and a rear end;
the base is constructed with two front wheels and two rear wheels attached to the two longitudinal sides;
the enclosed mobility scooter is controlled by a person standing on the base;
a back support is mounted to a first column secured at a lower end of the base for supporting the person;
a head support is mounted to an upper end of a second column;
a clear enclosure mounted to the base has front and rear sides which extend from the base to a top of the clear enclosure; and
the clear enclosure has two side openings through which the person is allowed to enter or exit the enclosed mobility scooter.

2. The enclosed mobility scooter of claim 1, wherein the base comprises two injection-molded parts connected to each other, and each of the injection-molded parts is a rectangular body.

3. The enclosed mobility scooter of claim 1, wherein the base is fabricated by deep-drawing or tensile compressive shaping of one or more metal blanks.

4. The enclosed mobility scooter of claim 1, wherein the base is fabricated from a group comprising plastic, metal and plastic, composite materials, deep-drawing and tensile compressive shaping of one or more metal blanks, and fiber composites.

5. The enclosed mobility scooter of claim 1, wherein a steering column whose inclination is adjustable, is fastened to the base between the front wheels.

6. The enclosed mobility scooter of claim 1, wherein the steering column is capable of moving to a substantially upright position or into an oblique position in rearward or forward directions by tilting so as to be adapted to different sized drivers.

7. The enclosed mobility scooter of claim 1, wherein the back support is secured to the first column so that it is adjustable and movable towards and away from the base.

8. The enclosed mobility scooter of claim 7, wherein the back support has a curved shape to support the back.

9. The enclosed mobility scooter of claim 8, wherein a bottom end of the second column is secured to an upper end of the first column.

10. The enclosed mobility scooter of claim 9, wherein the head support has a curved shape to support the head.

11. The enclosed mobility scooter of claim 1, wherein the clear enclosure is removably mounted to the base.

12. The enclosed mobility scooter of claim 11, further including a first basket attached to a front part of the clear enclosure of the enclosed mobility scooter.

13. The enclosed mobility scooter of claim 12, further including a second basket attached to a rear part of the clear enclosure of the enclosed mobility scooter.

14. The enclosed mobility scooter of claim 1, wherein the power distribution receives power from a power source and distributes the power to the controller processor, the sensor processor, and the drive motor controller.

15. The enclosed mobility scooter of claim 14, wherein the sensor processor processes information detected by the floor distance sensor and the floor type sensor.

16. The enclosed mobility scooter of claim 15, wherein the sensor processor detects if there is an obstruction in front of the front wheels and the rear wheels and issues a visual indication and a first control signal to the controller processor to shut the drive motors off.

17. The enclosed mobility scooter of claim 16, wherein the floor distance sensor, in combination with the sensor processor, detects height changes in floor surfaces and issues a second control signal to the controller processor for a stop and reverse command so that the enclosed mobility scooter does not tumble down stairs.

* * * * *